United States Patent Office  2,881,153
Patented Apr. 7, 1959

2,881,153

STABLE THIOUREA AND UREA MIXED RESINS AND THEIR PREPARATION

William Frank Herbes and Raymond Polansky, Somerville, N.J., assignors to American Cyanamid Company, New York, N.Y., a corporation of Maine No Drawing. Application March 18, 1955
Serial No. 495,324

19 Claims. (Cl. 260—70)

The present invention relates to water-soluble hydrophilic mixed resins derived from thiourea and urea, as well as to the preparation of such resins.

Thiourea-formaldehyde resins, including those of a water-soluble nature are well known in the art. They have commonly been considered to be equivalents of urea-formaldehyde condensates; and, while this is no doubt true for some varieties of resins, it is not the case with water-soluble resins, both in respect to their preparation and their stability as partial condensates in aqueous solution. For example, when a mol of thiourea is refluxed with formaldehyde in quantities of the order of 1.33 and 2.3 mols, it has been found that the reaction mixtures hydrophobe upon dilution with water after relatively short reaction periods. Yet, under the same conditions, urea-formaldehyde mixtures can be refluxed considerably longer and still yield partial condensates of a water-soluble and a water-dilutable nature. Moreover, even when water-soluble thiourea-formaldehyde resins are obtained, they have a serious drawback in their lack of stability, especially in concentrated solutions, which is manifested by a tendency to precipitate as crystals, or even more so in respect to hydrophobing upon dilution with water. As a result, it has been customary to prepare the water-soluble variety of these resins immediately prior to their use. This has, of course, limited their utility greatly since many potential users lack the skill and equipment for the manufacture of resins. While numerous water-insoluble or hydrophobic precondensates have been prepared with thiourea, formaldehyde, and an alcohol as adhesives and for molding purposes, etc., there has been no suggestion that a stable hydrophilic or water-dilutable resin of relatively low formaldehyde content could be prepared in this manner. Relatively large proportions of formaldehyde, as for example, a 3:1 formaldehyde:thiourea molar ratio, have been employed to solubilize or stabilize such resins at least temporarily. However, this practice is objectionable for many purposes, inasmuch as an aqueous solution of the resins contains a relatively large amount of free formaldehyde which is extremely annoying and is a health hazard to operators working around the open tanks which are conventionally employed in certain industries. In addition, the presence of excessive quantities of free formaldehyde in resins employed in the treatment of textiles results in unsalable products having a fish odor even after the resin-treated fabric is cured and subjected to a process wash.

In our concurrently filed application Serial No. 495,325, it is disclosed that the stability of thiourea-aldehyde resins may be greatly improved by reacting an aliphatic monohydric water-soluble alcohol with the thiourea-aldehyde condensate under certain carefully controlled conditions.

An object of the present invention is to provide improved hydrophilic thiourea resin mixtures.

Another object of the invention is to provide hydrophilic resin mixtures containing thiourea-formaldehyde derivatives and having improved stability against hydrophobing and crystallization.

A further object of the invention is to provide an efficient process for the manufacture of stable hydrophilic resin mixtures containing thiourea resins.

Other objects and advantages of the invention will be apparent to those skilled in the art upon consideration of the detailed disclosure hereinbelow.

The present invention is concerned with novel compositions of a water-soluble hydrophilic nature. These comprise the water-soluble hydrophilic products of treating at a temperature above about 45° C. and pH between about 4.0 and and about 6.0 relative proportions of at least about 0.4 mol of a water-soluble aliphatic monohydric alcohol per mol on a monomeric basis of a hydrophilic aldehyde condensate of thiourea in which the reaction is halted after a substantial amount of alcohol has reacted and before a sample of the reaction mixture hydrophobes upon dilution with 50 volumes of water at 20° C., and a hydrophilic water-soluble urea derivative of the group consisting of the monomers and lower polymers of methylol urea and lower alkyl ethers of methylol urea in proportions such that said urea derivative has an urea content between about 0.6 and about 7.0 parts by weight per part of original thiourea. The invention also relates to an improved process whereby the thiourea condensate and the urea derivative are simultaneously treated with the alcohol. Narrower aspects of the invention involve the preferred proportions, the species of urea derivatives and the optimum pH range for the alcohol treatment.

It has been found that in addition to the stabilizing effect on thiourea-aldehyde condensates of the alcohol treatment in our aforementioned application that a further stabilizing effect is obtained by blending a resin derived from urea with the alcohol-treated thiourea-aldehyde condensate. This blending of the resins or condensates may take place either before or after the alcohol treatment in preparing the products of the present invention. However, it has been discovered that the reaction conditions of the alkylation or alcohol treatment are far less critical when performed on the mixed resins in lieu of the thiourea-aldehyde condensate alone. A much wider range of temperatures and pH values are operative with the blend of resins. For example, the alkylation of the blended resins may be carried out at pH's ranging from about 4.0 to about 6.0 and the reaction temperatures extending from 45° C. where the reaction rate first reaches a feasible minimum up to reflux temperatures of about 92 to 95° C. and higher if a pressure vessel is employed; whereas reacting the alcohol with the thiourea-aldehyde condensate in the absence of other compounds requires an acidity within the narrow range of pH values from 4.5 to 5.6 and the maintenance of the temperature in the similarly restricted range of 45 to 65° C.

By the alcohol treatment of the blended condensates, resins containing substantial amounts of thiourea-aldehyde condensates may be stabilized or inhibited against both hydrophobing, which is defined herein as precipitating upon diluting one part of the sample with 50 parts of water by volume at 20° C., and against crystallization or separation in the undiluted resin solution for comparatively long periods. Hydrophobing is generally attributed to an increase in molecular weight resulting from condensation polymerization. The stabilizing and inhibiting effects of the present invention are needed the most and are the most pronounced in the case of concentrated aqueous solutions of resins containing thiourea-aldehyde condensates.

A water-soluble monohydric aliphatic alcohol is employed in the present process. Among the suitable compounds are methanol, ethanol, propanol, and isopropanol, as well as mixtures of two or more of these alcohols. Higher alcohols are unsatisfactory since they decrease the hydrophilic characteristics with which the present invention is particularly concerned. Methanol is greatly preferred for the purpose, as it enhances the hydrophilic characteristics of the product and is cheap and readily available.

In preparing the hydrophilic condensates which are used herein as reactants, a wide variety of water-soluble aldehydes may be employed, including formaldehyde, acetaldehyde, propionaldehyde, glyoxal and the like. Formaldehyde is preferred for the purpose, especially in its more concentrated forms, such as paraformaldehyde and hexamethylene tetramine in order to minimize the amount of water introduced into the system when a concentrated final product is sought. However, formalin may be used or other formaldehyde-engendering substances may be employed where desired. The expression "formaldehyde" is used in a generic sense herein to denote not only formaldehyde but also its polymers, formaldehyde-engendering substances and other equivalents, inasmuch as these all form formaldehyde at least momentarily during the condensation reaction.

A hydrophilic thiourea-aldehyde condensate is required for the present process, and this may be obtained by reacting at least about 1.0 mol of formaldehyde per mol of thiourea at a pH above 7. Suitable reaction conditions are a pH between about 7.2 and about 10.5 and a reaction temperature above about 45° C. for a period of about 15 minutes to about 3 hours. When urea is also present with the thiourea during the reaction with formaldehyde, the reaction mixture may be heated above about 70° C., as for instance by refluxing (about 95° C.), or at even higher temperatures under elevated pressures. As is apparent from the examples below, this methylolation may be and preferably is carried out in the presence of the alcohol which is later reacted with the condensate under specified conditions.

In the final compositions of the present invention, there is a compatible urea-containing component also. Among the suitable water-soluble and water-dilutable or hydrophilic urea derivatives are the monomers and lower polymers of methylol urea and ethers of methylol urea with alcohols containing from 1 to 3 carbon atoms. These include monomethylol urea and dimethylol urea, as well as the mono- and di-ethers thereof. Although the ethers derived from ethanol, propanol, and isopropanol are also contemplated for the purpose, the methyl ethers of the urea compounds are greatly preferred. The lower polymers of the aforementioned materials, that is those having molecular weights sufficiently low to be hydrophilic and water-soluble, are also suitable constituents of the blended resins. The urea content, regardless of whether it is present as urea or various derivatives thereof, should be within the range between about 0.6 and about 7.0 (preferably not over 4.0) parts by weight of original urea per part of original thiourea.

In carrying out the novel processes, the urea derivative may be mixed with the thiourea-aldehyde condensate at the time of reaction with the alcohol as described more specifically hereinbelow. However, it is usually preferred to react urea per se with formaldehyde in the presence of thiourea or a thiourea-aldehyde condensate prior to the reaction involving the alcohol. For example, one excellent method is to react from 1.0 to 2.3 mols of paraformaldehyde with 1 mol of a mixture of urea and thiourea in the proportions set forth above at a pH of 7.2 to 8.5 in the presence of 1.3 mols of methanol for a period of 1 to 3 hours at reflux temperatures of the order of 95° C. to form probably essentially a mixture of methylol ureas and thioureas. Formic acid is then introduced to change the pH to between 4.0 and 6.0 and refluxing is then continued for between 15 minutes to 2 hours to probably produce methyl ethers of the methylol thioureas and methylol ureas. After this, the reaction is halted by adding 50% aqueous sodium hydroxide to increase the pH to between 7 and 9; and the mass is cooled and clarified by means of a pressure filter.

In another aspect of the process described herein, the thiourea may be condensed with formaldehyde in considerable excess first, and the urea later added to the reaction mixture along with additional formaldehyde if the quantity present in the original mixture is insufficient, after which the alcohol reaction follows. In a further variation of the process, urea may first be reacted with formaldehyde under alkaline conditions with thiourea being added later along with more formaldehyde if necessary to form the precondensate which is subsequently treated with the alcohol under acid conditions.

Still another modification of the process involves refluxing urea and a relatively large amount of paraformaldehyde in water to form methylol urea at an alkaline pH; then acidifying the reaction mass while continuing at reflux temperature for a limited time to produce partially polymerized but still water-soluble methylol urea. Next, a suitable alkaline agent is added to raise the pH above 7 again along with methanol and thiourea which latter compound reacts with the formaldehyde present. The reaction with the methanol already present is brought about by the introduction of an agent suitable for lowering the pH to 4.0 to 6.0 while maintaining the reaction temperature.

It is apparent that the aldehyde may be introduced at several points in the methylolation reaction described above, and considerable excesses of aldehyde in the reaction mixtures are permissible before the addition of the final resin-forming material, e.g., thiourea or urea. However, it is highly desirable to keep the total aldehyde content of the reaction mixture at the time of the alcohol treatment between 1.0 and 2.3 mols per mol of resin-forming material. This is best accomplished by charging a total of 1.0 to 2.3 mols during preparation of the hydrophilic condensates. The expression "total aldehyde" is used to include both the free aldehyde and the aldehyde which has combined with one or more of the resin-forming substances. These two forms are in equilibrium in the reaction mixture; and in general the free aldehyde increases with an increase in the total aldehyde present. When the total aldehyde content exceeds 2.3 mols per mol of resin forming material, the free aldehyde is sufficient to render the product objectionably odorous for many purposes and materials treated therewith usually have an undesirable odor after curing.

The alcohol may suitably be present in relatively large proportions ranging from about 0.4 up to about 8 or more mols (at least 0.8 mol being generally preferred) per mol of the original thiourea—that is, per mol of thiourea employed in preparing the precondensate with an aldehyde. Large excesses of the alcohol appear to do no harm, but are not necessary and sometimes require the extra step of removing the unreacted alcohol by distillation under subatmospheric pressures. Accordingly, where a concentrated product is sought, is is usually desirable to employ relatively small quantities of alcohol, as for instance from 1.0 to 1.3 mols per mol of the total mols of thiourea and urea taken.

Although the nature of the present alcohol treatment has been postulated as an alkylation or etherification by condensation of the alcohol with one or more of the hydroxyl groups in the methylol radicals of the thiourea and urea derivatives, this has not been established with certainty. Also, it is thought that the reaction products disclosed herein are essentially monomeric in nature, except when the urea derivative is introduced as a low polymer or partially polymerized in situ as described above, because it is unlikely that the solubility characteristics obtained could be secured with higher polymers. Nevertheless, it is possible that the novel products contain appreciable and perhaps even major proportions of low-order condensation polymers, such as dimers, trimers, etc., under the severest reaction conditions described therein.

In the alcohol treatment which is carried out with the reaction mixture containing both the thiourea and urea derivatives at a pH between about 4.0 and about 6.0, and preferably between 4.5 and 5.6, it is apparent that the treatment differs from that in which a thiourea compound alone is treated because a larger molar ratio of alcohol combines. For example, between about 0.1 and about 1.4 mols of alcohol may react or combine per mol of thiourea and urea taken. It also is evident that the thiourea-formaldehyde compounds combine with or are converted in some way by the alcohol. This may be postulated by the fact that if only the urea derivative were reacted with the alcohol, then it should be possible to stabilize a concentrated unalkylated hydrophilic thiourea-formaldehyde condensate by the addition thereto of methylated methylol urea, which is the ether of a urea-formaldehyde derivative. However, the blending of these materials does not stabilize the thiourea component, whereas treating a blend of the thiourea and urea derivatives with alcohol does. Similarly, a physical mixture of methylated thiourea-formaldehyde and unmethylated urea-formaldehyde displays the improved stability. In the present process it is estimated that in alkylating the mixed condensates, the extent of alkylation of the thiourea derivative amounts to between about 10% and about 30% and possibly even more of the available methylol groups thereon. The preferred stage of reaction ranges from about 0.1 mol to about 0.7 mol of alcohol per mol of thiourea plus urea taken. So far as the novel compositions are concerned, the mixture may contain as much as 1.8 mols of combined alcohol per mol of thiourea and urea where the latter two compounds are alkylated separately, as this permits a higher extent of alkylation of the urea component.

The time of the alcohol reaction varies inversely with the severity of the reaction conditions and is usually between about 15 and about 120 minutes. When any process variables are changed, the proper reaction time should be determined by experiment. This may be done very simply by removing small samples of the reaction mixture at 5- or 10-minute intervals during the course of the reaction until one of these samples hydrophobes upon dilution with 50 times its volume of water at 20° C. When the sample becomes cloudy upon dilution, the reaction has proceeded too far for the purposes of the present invention; and the reaction time should be decreased about 20 to 80% in order to react the alcohol to the extent specified above. In general, a decrease of about one-third in such a reaction time is recommended. Halting the reaction at the proper point is a critical and essential part of the present process, as materials which have been reacted to the stage where they will crystallize or hydrophobe do not accomplish the desired results. This is effected by adjusting the pH of the mixture to a neutral or alkaline value, pH's of the order of 7.0 to 8.5 being preferred, although higher pH's may be used if desired. The reaction mixture is usually cooled at the same time; and where a more concentrated product is required, this may be accomplished by vacuum distillation at temperatures ranging from 25 to 55° C. to avoid further condensation of the reaction mixture. Concentrations of 75 to 80% solids are readily obtained in this fashion.

The products of the present invention are useful in fields wherein the water-soluble thiourea-aldehyde condensates are employed, including paper making, as chemical intermediates, and as resin finishes for textiles. The various applications of the novel compositions form no part of the present invention; however, these resinous mixtures have been found to have outstanding utility as fire-retardant finishes for textiles as described and claimed in our concurrently filed application, Serial No. 495,326, of L. J. Moretti and W. N. Nakajima, wherein they are cured to the water-insoluble state on nylon and other fabrics at elevated temperatures in the presence of suitable catalysts.

For a better understanding of the nature and purposes of this invention, reference should be had to the following illustrative examples, in which all proportions are given in terms of weight unless otherwise stated therein.

*Example I*

Into a 3-liter, 3-necked flask equipped with a thermometer, stirrer, reflux condenser, and an electric heating mantle are charged 606 grams (18.9 mols) of methanol, 1368 grams (18.0 mols) of thiourea, 714 grams (21.6 mols) of 91% paraformaldehyde and about 9.0 ml. of 50% aqueous triethanolamine. This mixture is slowly heated to 50° C. with constant stirring. After one hour it is noted that solution is nearly complete, and the pH is found to be 8.5. The temperature is maintained at 50 to 55° C. for another hour, then 19.5 ml. of 5 N aqueous solution of formic acid is added to lower the pH to 5.1. The reaction mixture is held for another hour at the 50 to 55° C. temperature range; after which the pH is adjusted to about 7.8 with 5 N aqueous sodium hydroxide, and it is cooled to room temperature. Upon filtering, a clear syrup containing 75% solids is obtained.

A urea-formaldehyde resin syrup is prepared by heating a mixture of 2.1 mols of 37% aqueous formaldehyde per mol of urea at a temperature of about 100° C. for a period of 30 minutes at a pH of approximately 8.0 and then at a temperature of 100° C. for 1 to 3 hours at a pH of 5.3 to 5.5 until a viscosity at 20° C. of 32 centipoises is reached. Next, it is neutralized with 10 N aqueous sodium hydroxide, cooled, filtered, and concentrated to 85% solids under a vacuum of 20 inches of mercury with gentle heating up to 60° C. The resulting syrup is essentially a concentrated aqueous dispersion of partially polymerized dimethylol urea which is hydrophilic or infinitely dilutable in water. Fifty-four (54) parts by weight of this syrup are blended with 46 parts of the above thiourea product. This resin mixture is found to be compatible and does not hydrophobe upon storage for several weeks at 25° C.

Several batches of both the thiourea resin syrup and the mixed resin syrup are prepared, and the samples of these syrups in the concentrated form are stored at various temperatures for stability tests. The stability is determined by observing the clear samples for precipitation in concentrated form and upon diluting a portion of the sample with 50 volumes of water at 20° C. to check for any hydrophobing. The following stability results are obtained:

| Storage temperature | Unmixed thiourea reaction product, days | Thiourea-urea resin blend, days |
| --- | --- | --- |
| 100° F | 6–10 | 10–15 |
| 78° F | 15–20 | 21–28 |
| 54° F | 21–35 | >60 |

It is apparent that the blended resin is considerably more stable than the thiourea reaction syrup alone.

For application to 30 denier, 2-ply nylon Rachelle net, 1.6 parts by weight of ammonium bromide dissolved in 23.4 parts of water are stirred into 100 parts of the above resin blend to accelerate the curing of the composition. The Rachelle net is padded through this concentrated solution in a padder having the squeeze rolls adjusted for a 100% wet pickup. Then the treated fabric is put on a 10-inch pin frame using tension and placed in an oven maintained at 340° F. for 1.2 minutes. The treated net has a desirably stiff and resilient finish and is found to safely meet the standards prescribed in the Flammable Fabrics Act (P.L. 88—83d Congress) both initially and after being both laundered and dry cleaned:

whereas the original nylon net is classed as a fabric subject to rapid and intense burning, and a treated fabric is classified similarly after the impregnation and curing therein of an equivalent quantity of resin consisting of urea-formaldehyde alone.

Example II

Another blended resin is prepared by mixing two parts by weight of the thiourea reaction product syrup of Example I and one part of the urea-formaldehyde syrup described therein. The stability upon storage is found to be similar to that of Example I.

Example III

Example I is repeated using one part by weight of the thiourea reaction product and two parts of the same urea-formaldehyde syrup with similar results.

Example IV

A one-liter flask is equipped as in Example I and charged with 378 grams (6.3 mols) of isopropanol, 456 grams (6.0 mols) of thiourea and 3 ml. of 50% aqueous triethanolamine. After heating these ingredients to 50° C., 238 grams (7.2 mols) of 91% paraformaldehyde is added, and the batch is held at 50 to 55° C. for two hours with constant stirring. Next, 14 ml. of 5 N formic acid are added to reduce the pH to 4.9; and the temperature is maintained in the stated range for another hour. Sufficient 5 N sodium hydroxide solution is added to increase the pH to 7.8, and the reaction mixture is cooled to room temperature and filtered to yield a clear syrupy liquid of about 75% solids content by weight.

A blend of 46 parts of this product and 54 parts of the urea-formaldehyde syrup used in Example I is thoroughly mixed and found to have a shelf life of the same order as the blend of Example I.

Example V

The procedure of Example I is followed in preparing a blend of 50 parts by weight of the thiourea reaction product of Example I and 50 parts of a 65% aqueous solution of water-soluble methylated partially polymerized dimethylol urea. The latter resin is obtained by reacting 18.7 mols of paraformaldehyde, 8.3 mols of urea and 11.0 mols of methanol at 85° C. and pH 8.2 to 8.4 for 2¾ hours; then 33 mols of methanol and sufficient oxalic acid are added to lower the pH to 2.7 to 3.0, followed by reacting for 30 minutes. The syrup is made alkaline with 10 N aqueous sodium hydroxide, cooled and filtered. This blend also displays the excellent stability described in Example I.

Example VI

A suitable 2-liter flask is equipped as in Example I and charged with 195 ml. (10.9 mols) of water, 305 grams (5.1 mols) of urea and 5 ml. of 50% aqueous triethanolamine. The charge is heated to 50° C., and 528 grams (16.0 mols) of 91% paraformaldehyde is added. The batch is then heated to reflux, and kept at the reflux temperature of 106° C. for 30 minutes; the pH is 7.8. The pH is adjusted to 5.4 with 5 N formic acid; and the mixture is refluxed at this pH for one hour, after which the pH is adjusted to 7.3 with 5 N sodium hydroxide. The batch is then cooled to 75° C. and 300 grams (9.4 mols) of methanol and 317 grams (4.2 mols) of thiourea are added. The temperature of the batch drops to 50 to 55° C. and is kept in this range for one-half hour; the pH is 7.7. Next, the batch is adjusted to a pH of 5.5 with 5 N formic acid, and reacted at this pH at 50 to 55° C. for one hour. The batch is adjusted to a pH of 8.0 with 5 N sodium hydroxide, cooled to 30° C. and filtered. The filtrate is then vacuum concentrated below 50° C. from 65 to 80% solids. The syrupy product contains 23% thiourea and displays no tendency to crystallize or to hydrophobe upon dilution for 3 weeks of storage at 37° C., 5 weeks at 25° C., and more than 9 weeks at 12° C.

For a product containing 20% thiourea at the same concentration of solids, 345 grams of urea and 276 grams of thiourea are used in the above procedure. A chemical analysis of this composition yields the following results:

| Material | Percent | Mols per mol of thiourea | Mols per mol of urea and thiourea |
|---|---|---|---|
| Total formaldehyde | 35.4 | 4.34 | 1.69 |
| Free formaldehyde | 2.1 | 0.26 | 0.10 |
| Combined formaldehyde | 33.3 | 4.08 | 1.59 |
| Methylol formaldehyde | 18.0 | 2.21 | 0.86 |
| Total methanol | 7.7 | 0.88 | 0.35 |
| Free methanol | 5.1 | 0.58 | 0.23 |
| Combined methanol | 2.6 | 0.30 | 0.12 |
| Nitrogen as urea | 25.7 | 1.57 | 1.00 {0.61 |
| Sulfur as thiourea | 20.7 | 1.00 | 0.39} |
| Percent methylation | 12.0 | | |

$$\text{Percent methylation} = \frac{\text{Mols of formaldehyde methylated} \times 100}{\text{Mols of formaldehyde available for methylation}}$$

$$= \frac{\text{Mols of combined methanol} \times 100}{\text{Mols of methylol formaldehyde} + \text{mols of combined methanol}}$$

The percent of combined formaldehyde is taken as the difference between percent total formaldehyde and percent free formaldehyde. The free formaldehyde content is determined by the conventional sulfite method in the presence of a known amount of acid, back titrating with caustic soda solution. The total formaldehyde figure is determined by a special method developed for use in resins in which sulfur is present. This method consists of hydrolyzing the resin with phosphoric acid in the presence of mercuric oxide (mercuric oxide is used to prevent interference of the sulfur). The methanol and the formaldehyde are distilled off into water, and total formaldehyde is determined by the standard alkaline peroxide method.

The percent combined methanol is taken as the difference between the percent total methanol and the percent free methanol. The total methanol figure is obtained by dichromate oxidation of the aforementioned distillate and back titration with thiosulfate, correcting for the formaldehyde which is also oxidized under these conditions. Free methanol is determined by a special method, in which the free methanol is esterified with a known excess of phthalic anhydride in the presence of pyridine. The unreacted phthalic anhydride is then converted to phthalic acid, and the free methanol content is calculated by determining the amount of ester found. The thiourea content is obtained by the standard Kjeldahl nitrogen method or by oxidizing the sulfur in a Parr bomb followed by its conversion to barium sulfate.

Example VII

Into a 2-liter flask fitted out according to Example I are charged 44 ml. (2.4 mols) of water, 336 grams (10.5 mols) of methanol, 202 grams (2.66 mols of thiourea) 580 grams (17.6 mols) of 91% paraformaldehyde, and 7.0 ml. of a 50% aqueous triethanolamine solution. This mass is heated to the reflux temperature of 94° C. with stirring and held there for 30 minutes. Then 320.4 grams (5.33 mols) of urea are added. After refluxing this mixture at 90° C. for two hours, 5.1 ml. of 5 N formic acid are added to reduce the pH to 5.6, and the reaction mixture is refluxed for an additional half hour. Next, the pH is raised to about 9.0 with 8 ml. of 5 N aqueous sodium hydroxide solution. Finally, the reaction mixture is cooled and clarified upon a pressure filter. A sample of this product is observed and found to be stable against hydrophobing or separation for more than two months at 12° C. and at 25° C. The following values are obtained by chemical analysis of the product:

| Material | Percent | Mols per mol of thiourea | Mols per mol of thiourea and urea |
|---|---|---|---|
| Total formaldehyde | 33.7 | 6.08 | 2.22 |
| Free formaldehyde | 5.96 | 1.08 | 0.376 |
| Combined formaldehyde | 27.7 | 5.00 | 1.741 |
| Methylol formaldehyde | 11.2 | 2.02 | 0.705 |
| Total methanol | 20.2 | 3.41 | 1.190 |
| Free methanol | 10.8 | 1.82 | 0.638 |
| Combined methanol | 9.4 | 1.59 | 0.555 |
| Nitrogen as urea | 20.6 | 1.86 | 1.00 {0.65 |
| Sulfur as thiourea | 14.1 | 1.00 | {0.35 |
| Percent methylation | 44.0 | | |

Example VIII

Into a suitable 3-liter flask equipped as in Example I are charged 240 ml. (13.3 mols) of water, 80 grams (2.5 mols) of methanol, 440 grams (7.3 mols) of urea and 4.5 grams of triethanolamine (80% technical grade). The charge is heated to 30° C. and 600 grams (18.2 mols of HCHO) of 91% paraformaldehyde is added. Next, the batch is heated to reflux (100° C.) and kept at this temperature for 30 minutes; the pH is 8.3. A sufficient amount of 5 N formic acid is added to lower the pH to 5.2, and the mixture is then refluxed for one hour after which the pH is adjusted to 7.1 with 5 N sodium hydroxide. After cooling to 70° C., 250 grams (7.8 mols) of methanol and 228 grams (3.0 mols) of thiourea are added. The temperature of the reaction mixture drops to 50 to 55° C. and is kept in this range for 30 minutes; the pH is 7.6. Next, the pH of the reaction mixture is adjusted to 5.2 with 5 N formic acid, and the temperature is maintained at 50 to 55° C. for one hour. With 5 N sodium hydroxide, the pH of the mixture is raised to 8.0 and the material is cooled to 38 to 40° C. and filtered. The filtrate which has a solids content of 65% by weight is concentrated under vacuum at a temperature below 50° C. to 80% solids. The resulting product is a clear syrup which has a thiourea content of 15% by weight. It displays no tendency to crystallize or to hydrophobe upon dilution when stored for two weeks at 37° C., or five weeks at 25° C., or more than two months at 12° C.

Example IX

The flask employed in Example VII is charged with 44 ml. (2.3 mols) of water, 336 grams (10.5 mols) of methanol, 580 grams (17.6 mols) of 91% formaldehyde, 121.6 grams (1.6 mols) of thiourea and 6.4 ml. of a 50% aqueous triethanolamine solution. This charge is heated to reflux (95° C.) for over 30 minutes and refluxed for 30 minutes before adding 384 grams (6.4 mols) of urea. Upon solution of the urea, the pH of the mixture is 7.4, and the reflux temperature drops to 92° C. After refluxing for two more hours, 22 ml. of 1 N formic acid are added to lower the pH to 5.27, and the charge is held at the reflux temperature of 92.5° C. for another hour. Next, the pH is raised to 9.5 with 42.5 ml. of 1 N aqueous sodium hydroxide solution while continuing the constant stirring, and the mixture is cooled to 40° C. before filtering under pressure using a filter aid. A chemical analysis of the product yields the following results:

| Material | Percent | Mols per mol of thiourea | Mols per mol of thiourea and urea |
|---|---|---|---|
| Total formaldehyde | 35.3 | 9.90 | 2.340 |
| Free formaldehyde | 6.3 | 1.77 | 0.418 |
| Combined formaldehyde | 29.0 | 8.13 | 1.922 |
| Methylol formaldehyde | 10.3 | 2.88 | 0.682 |
| Total methanol | 19.8 | 5.20 | 1.232 |
| Free methanol | 9.8 | 2.57 | 0.609 |
| Combined methanol | 10.0 | 2.63 | 0.623 |
| Nitrogen as urea | 23.0 | 3.23 | 1.00 {0.763 |
| Sulfur as thiourea | 9.0 | 1.00 | {0.237 |
| Percent methylation | 47.3 | | |

The storage characteristics of this resin mixture are set forth in the table below.

A pad bath consisting of 85 parts by weight of the above product, 1.28 parts of ammonium bromide and 23.78 parts of water are applied to 40-denier tricot by padding through hard rubber rolls adjusted for a wet pickup of 100%. The impregnated fabric is dried and cured in a single operation in a Kenyon Box Drier at 340° F. during a period of 70 seconds. Initially and after both dry cleaning and laundering operations, the treated fabric meets the combustibility standards of the Flammable Fabrics Act. In addition, this material has a desirably springy, stiff hand. The same nylon tricot before treatment and after treatment with a conventional urea-formaldehyde finish failed to meet the standards of the aforesaid law.

Examples X–XVIII

The procedure of Example IX is followed with variations in the quantities of reactants and reaction conditions in the manner set forth in the table below, wherein urea is designated as "U" and thiourea as "TU."

| Example | Mol Ratio U:TU | Mol Ratio HCHO: U+TU | Mol Ratio Methanol: U+TU | Alk. pH with TU | Alk. Reflux Time of TU, min. | Alk. pH After U Added | 2d Alk. Reflux Time, hr. | Acid pH | Acid Reflux Time, min. | Fin. pH | Product Water-Dil'ty | Product Stability in Weeks 12° C. | 25° C. | 50° C. |
|---|---|---|---|---|---|---|---|---|---|---|---|---|---|---|
| IX | 4:1 | 2.2:1 | 1.3:1 | 7.2-7.5 | 30 | 8.0-8.2 | 1 | 5.2-5.5 | 60 | 8.5-9.0 | Infinite | >17 | >17 | 11 |
| X | 8:1 | 2.2:1 | 1.3:1 | 7.2-7.5 | 30 | 8.0-8.2 | 1 | 5.2-5.5 | 60 | 8.5-9.0 | do | | >17 | >17 |
| XI | 3:1 | 2.2:1 | 1.3:1 | 7.2-7.5 | 30 | 8.0-8.2 | 1 | 5.2-5.5 | 60 | 8.5-9.0 | do | >17 | >17 | 4 |
| XII | 2:1 | 2.2:1 | 1.3:1 | 7.2-7.5 | 30 | 8.0-8.2 | 1 | 5.2-5.5 | 60 | 8.5-9.0 | do | 10 | 7 | 1 |
| XIII | 4:1 | 2.2:1 | 1.3:1 | 7.2-7.5 | 30 | 8.0-8.2 | 2 | 5.0-6.0 | 90 | 8.5-9.0 | do | | | |
| XIV | 3:1 | 2.2:1 | 1.3:1 | 7.2-7.5 | 30 | 8.0-8.2 | 2 | 5.2-5.6 | 80 | 8.5-9.0 | do | | | |
| XV | 2:1 | 2.2:1 | 1.3:1 | 7.2-7.5 | 30 | 8.0-8.2 | 1.5 | 5.2-5.6 | 30 | 8.5-9.0 | do | >8 | >8 | 2 |
| XVI | 4:1 | 2.2:1 | 1.3:1 | 7.2-7.5 | 20 | 8.0-8.2 | 1 | 5.2-5.6 | 105 | 8.5-9.0 | do | | | |
| XVII | 3:1 | 2.2:1 | 1.3:1 | 7.2-7.5 | 20 | 8.0-8.2 | 2 | 5.2-5.6 | 45 | 8.5-9.0 | do | >8 | >8 | >8 |
| XVIII | 2:1 | 2.2:1 | 1.3:1 | 7.2-7.5 | 20 | 8.0-8.2 | 1.5 | 5.2-5.6 | 30 | 8.5-9.0 | do | | | |

While there are above disclosed only a limited number of the embodiments of the process and the product of the invention hereinpresented, it is possible to produce still other embodiments without departing from the inventive concept hereindisclosed; and it is, therefore, desired that only such limitations be imposed on the appended claims as are stated therein.

What we claim is:

1. A composition of matter which comprises water-soluble, hydrophilic products of reacting at a temperature above about 45° C. and at a pH between about 4.0 and about 6.0, a water-soluble, aliphatic monohydric alcohol containing 1 to 3 carbon atoms, and a hydrophilic formaldehyde condensate of thiourea, said alcohol and formaldehyde condensate of thiourea being reacted in relative proportions of at least about 0.4 mole of alcohol per mole on a monomeric basis of said formaldehyde condensate of thiourea, in which the reaction is halted after a substantial amount of alcohol has reacted and before a sample of the reaction mixture hydrophobes upon dilution with 50 volumes of water at 20° C., and a hydrophilic water-soluble urea derivative of the group consisting of monomers and lower polymers of methylol ureas and lower alkyl ethers of methylol ureas, wherein said urea derivative has a urea content between about 0.6 and about 7.0 parts by weight per part of thiourea, the total formaldehyde content of the mixture is between about 1.0 and about 2.3 moles of formaldehyde per mole of urea and thiourea on a monomeric basis, and wherein from between about 0.1 and about 1.8 moles of alcohol are combined per total moles of thiourea and urea taken.

2. A composition of matter according to claim 1 in which said urea derivative comprises a partially polymerized methylol urea.

3. A composition of matter according to claim 1 in which said urea derivative comprises essentially monomeric methylol urea.

4. A composition of matter according to claim 1 in which said urea derivative comprises methylated methylol urea.

5. A composition of matter according to claim 1 in which said urea content amounts to between about 0.6 and about 4.0 parts by weight per part of thiourea.

6. A composition of matter according to claim 1 in which said alcohol comprises methanol, and said urea content amounts to between about 0.6 and about 4.0 parts per part by weight of thiourea.

7. A composition of matter according to claim 6 in which said urea derivative comprises a partially polymerized methylol urea and said treatment is carried out at a pH between about 4.5 and about 5.6.

8. A composition of matter according to claim 1 in which said alcohol comprises methanol, and said urea content amounts to between about 0.6 and about 4.0 parts per part by weight of thiourea.

9. A composition of matter according to claim 1 in which the pH is maintained between about 4.5 and about 5.6 during the alcohol treatment, said alcohol comprises methanol, said urea derivative comprises partially polymerized methylol urea and said urea content amounts to between about 0.6 and about 4.0 parts per part by weight of thiourea.

10. A process which comprises reacting at a temperature above about 45° C. and pH between about 4.0 and about 6.0, a water-soluble aliphatic monohydric alcohol containing from 1 to 3 carbon atoms and a hydrophilic formaldehyde condensate of thiourea in admixture with a hydrophilic formaldehyde condensate of urea, said alcohol and said formaldehyde condensates being reacted in relative proportions of at least about 0.4 mole of alcohol per mole on a monomeric basis of said formaldehyde condensate of thiourea, said hydrophilic condensate of urea being present in the admixture in an amount of between about 0.6 and about 7.0 parts by weight of urea per part of thiourea content, the total formaldehyde of said admixture being between 1.0 and 2.3 moles per mole of urea and thiourea on a monomeric basis during alcohol reaction, halting the reaction after a substantial amount of alcohol has reacted, said substantial amount being between about 0.1 and about 1.8 moles of alcohol per total moles of thiourea and urea taken and before a sample of the reaction mixture hydrophobes upon dilution with 50 volumes of water at 20° C.

11. A process according to claim 10 in which the treatment is carried out at a pH between about 4.5 and about 5.6.

12. A process according to claim 10 in which said compound is urea in an amount between about 0.6 and about 4.0 parts.

13. A process according to claim 10 in which said alcohol comprises methanol, and said compound comprises urea in an amount between about 0.6 and about 4.0 parts.

14. A composition of matter which comprises the reaction product according to claim 10.

15. A process which comprises reacting at a temperature above about 45° C. and pH between about 4.0 and about 6.0, a water-soluble aliphatic monohydric alcohol containing from 1 to 3 carbon atoms and a hydrophilic formaldehyde condensate of urea, said alcohol and said formaldehyde condensates being reacted in relative proportions of at least about 0.8 mole of alcohol per mole on a monomeric basis of said formaldehyde condensate of thiourea, said hydrophilic condensate of urea being present in the admixture in an amount of between about 0.6 and about 7.0 parts by weight of urea per part of thiourea content, the total formaldehyde of said admixture being between about 1.0 and 2.3 moles per mole of urea and thiourea on a monomeric basis during alcohol reaction, halting the reaction after a substantial amount of alcohol has reacted, said substantial amount being between about 0.1 and about 1.4 moles of alcohol per total moles of thiourea and urea taken and before a sample of the reaction mixture hydrophobes upon dilution with 50 volumes of water at 20° C.

16. A process according to claim 15 in which said alcohol comprises methanol, said compound comprises urea in an amount between about 0.6 and about 4.0 parts, and the pH is maintained between about 4.5 and about 5.6.

17. A composition of matter which comprises the reaction product according to claim 15.

18. A composition of matter which comprises the reaction product according to claim 16.

19. A process according to claim 16 in which the substantial amount of alcohol reacted is from between .1 and .7 mole per total moles of thiourea and urea taken.

References Cited in the file of this patent

UNITED STATES PATENTS

| | | |
|---|---|---|
| 2,329,651 | Powers et al. | Sept. 14, 1943 |
| 2,601,665 | Niles | June 24, 1952 |
| 2,645,625 | Bonzagni | July 14, 1953 |
| 2,681,326 | Christianson | June 15, 1954 |

OTHER REFERENCES

Ellis, "Chemistry of Synthetic Resins," vol. 1 (1935), Reinhold Publishing Corp.; N.Y., page 654. (Copy in Scientific Library.)